(12) United States Patent
Yatagai et al.

(10) Patent No.: US 11,845,432 B2
(45) Date of Patent: Dec. 19, 2023

(54) DRIVING SUPPORT SYSTEM

(71) Applicant: SUBARU CORPORATION, Tokyo (JP)

(72) Inventors: Takuro Yatagai, Tokyo (JP); Koji Ishizuka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 162 days.

(21) Appl. No.: 17/342,639

(22) Filed: Jun. 9, 2021

(65) Prior Publication Data

US 2021/0387619 A1 Dec. 16, 2021

(30) Foreign Application Priority Data

Jun. 10, 2020 (JP) ................. 2020-100779

(51) Int. Cl.
*B60W 30/14* (2006.01)
*B60W 30/18* (2012.01)
*B60W 40/072* (2012.01)
*B60W 40/105* (2012.01)
*G06V 20/56* (2022.01)

(52) U.S. Cl.
CPC .... *B60W 30/146* (2013.01); *B60W 30/18163* (2013.01); *B60W 40/072* (2013.01); *B60W 40/105* (2013.01); *G06V 20/588* (2022.01); *B60W 2552/30* (2020.02); *B60W 2552/53* (2020.02)

(58) Field of Classification Search
CPC ......... B60W 30/146; B60W 30/18163; B60W 40/072; B60W 40/105; B60W 2552/30; B60W 2552/53; B60W 30/18145; G06V 20/588
See application file for complete search history.

(56) References Cited

U.S. PATENT DOCUMENTS

| | | | |
|---|---|---|---|
| 2009/0157286 A1 | 6/2009 | Saito et al. | |
| 2010/0246889 A1* | 9/2010 | Nara | G06V 20/588 |
| | | | 382/104 |
| 2019/0126928 A1* | 5/2019 | Sakaguchi | B60W 30/18163 |
| 2020/0189586 A1* | 6/2020 | Choi | B60W 30/18145 |

FOREIGN PATENT DOCUMENTS

JP 2009-3795 A 1/2009

* cited by examiner

*Primary Examiner* — Nicholas Kiswanto
*Assistant Examiner* — Madison B Emmett
(74) *Attorney, Agent, or Firm* — TROUTMAN PEPPER HAMILTON SANDERS LLP

(57) ABSTRACT

A driving support system for a vehicle includes an information obtainer, a target vehicle speed calculator, a comparison processor, and a determination processor. The information obtainer is configured to obtain curvature information about a curvature of a driving lane of the vehicle and about a curvature of an adjacent lane. The adjacent lane is adjacent to the driving lane. The target vehicle speed calculator is configured to calculate a target vehicle speed in the driving lane and a target vehicle speed in the adjacent lane using the curvature information. The comparison processor is configured to compare a difference between the target vehicle speed in the driving lane and the target vehicle speed in the adjacent lane with a threshold. If the difference is greater than or equal to the threshold, the determination processor is configured to determine that a road branches off in a traveling direction of the vehicle.

7 Claims, 15 Drawing Sheets

DRIVING SUPPORT SYSTEM

CROSS-REFERENCE TO RELATED APPLICATION

The present application claims priority from Japanese Patent Application No. 2020-100779 filed on Jun. 10, 2020, the entire contents of which are hereby incorporated by reference.

BACKGROUND

The disclosure relates to a driving support system for a vehicle, and more particularly to a technology using a driving support system that determines whether a road branches off in a traveling direction of a vehicle.

Various types of driving support control for a vehicle are available, one of which is curve deceleration control for detecting that the vehicle is entering a curve and for controlling the brakes in advance.

A determination as to whether the vehicle is approaching a curve is made based on information about the position of the vehicle and map information.

In a traveling direction of the vehicle, a road may branch off from a driving lane of the vehicle. A suitable vehicle speed may be different depending on whether the vehicle is using this branching road. In this situation, it is desirable to determine whether the vehicle is using the branching road and to perform curve deceleration control only when it is determined that the vehicle is using the branching road.

To achieve such control, it is desirable that a driving support system correctly determine whether a road branches off in a traveling direction of the vehicle.

Japanese Unexamined Patent Application Publication No. 2009-003795 discloses a technology for determining whether a road branches off in a traveling direction of a vehicle by determining the line type of lane line drawn between lanes.

SUMMARY

An aspect of the disclosure provides a driving support system for a vehicle. The driving support system includes an information obtainer, a target vehicle speed calculator, a comparison processor, and a determination processor. The information obtainer is configured to obtain curvature information about a curvature of a driving lane of the vehicle and about a curvature of an adjacent lane. The adjacent lane is adjacent to the driving lane. The target vehicle speed calculator is configured to calculate a target vehicle speed in the driving lane and a target vehicle speed in the adjacent lane using the curvature information. The comparison processor is configured to compare a difference between the target vehicle speed in the driving lane and the target vehicle speed in the adjacent lane with a threshold. In a case where the difference is greater than or equal to the threshold, the determination processor is configured to determine that a road branches off in a traveling direction of the vehicle.

An aspect of the disclosure provides a driving support system for a vehicle. The driving support system includes circuitry. The circuitry is configured to obtain curvature information about a curvature of a driving lane of the vehicle and about a curvature of an adjacent lane. The adjacent lane is adjacent to the driving lane. The circuitry is configured to calculate a target vehicle speed in the driving lane and a target vehicle speed in the adjacent lane using the curvature information. The circuitry is configured to compare a difference between the target vehicle speed in the driving lane and the target vehicle speed in the adjacent lane with a threshold. In a case where the difference is greater than or equal to the threshold, the circuitry is configured to determine that a road branches off ahead of the vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

A lane line drawn between lanes may become pale over time as vehicles repeatedly drive or become hard to see because of sludge, for example. This may make it difficult to recognize that a road branches off in a traveling direction of a vehicle and thus fail to perform suitable deceleration control before the vehicle enters the curve.

The disclosure has been made in view of this background. It is desirable to correctly determine whether a road branches off in a traveling direction of a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The configuration of a driving support system for a vehicle according to the embodiment of the disclosure will be described below with reference to the accompanying drawings.

The driving support system for a vehicle according to the embodiment, not only determines whether a road branches off ahead of the vehicle, but also suitably performs deceleration control if it is found that the vehicle will use this branching road.

The determination result of the driving support system may be used for a purpose other than that for deceleration control. For example, if such a branching road is found, the driving support system may send this information to the driver who drives the vehicle or suggest which lane is appropriate to take to reach the destination. The driving support system may temporarily cancel part of autonomous driving control to allow the driver to change lanes to use the branching road.

Figure 1:
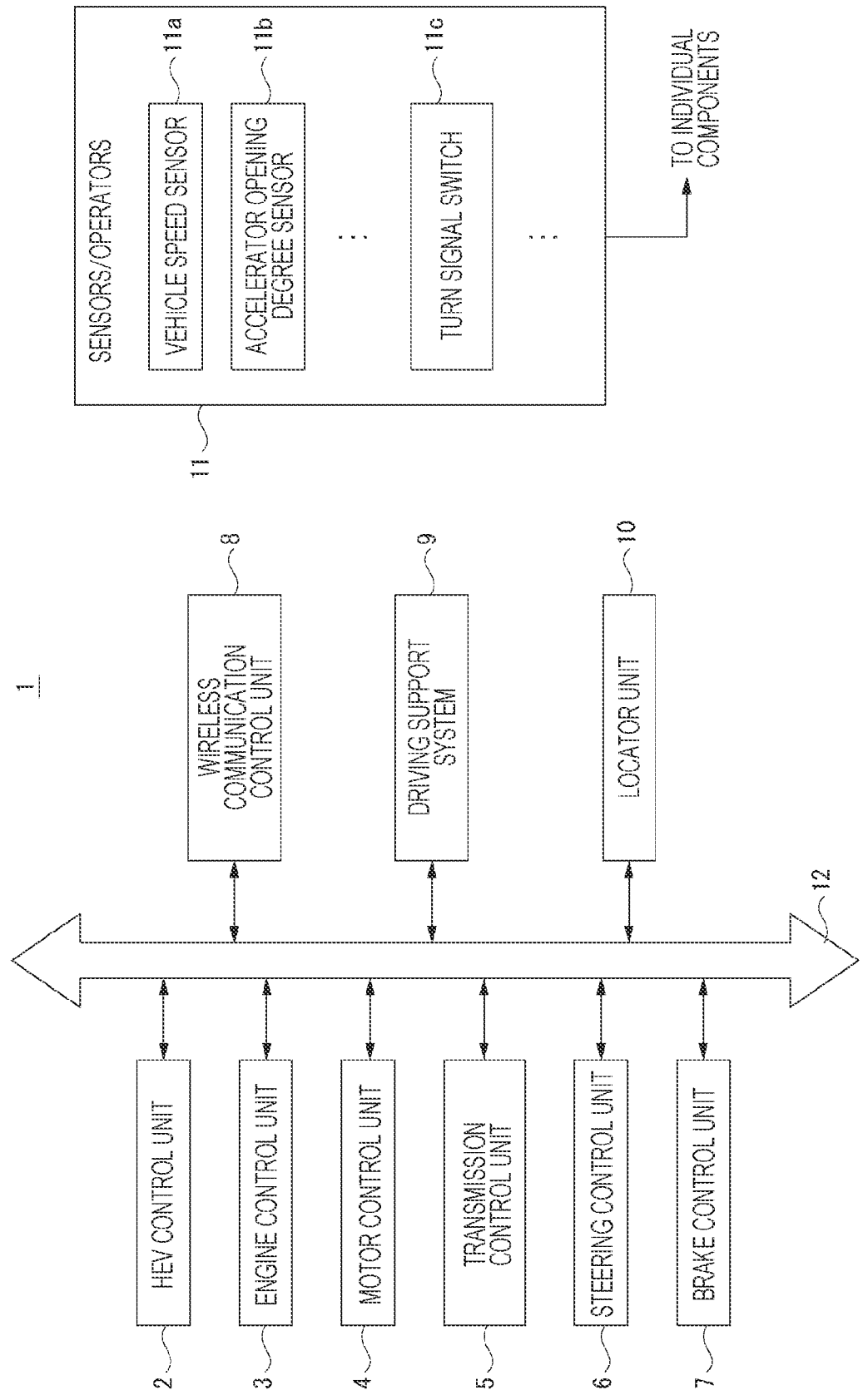
FIG. 1 is a schematic diagram illustrating an example of the configuration of a vehicle.

FIG. 1 is a schematic diagram illustrating an example of the configuration of a vehicle 100.

The vehicle 100 includes a vehicle control system 1. The vehicle control system 1 includes a hybrid electric vehicle (HEV) control unit 2, an engine control unit 3, a motor control unit 4, a transmission control unit 5, a steering control unit 6, a brake control unit 7, a wireless communication control unit 8, a driving support system 9, a locator unit 10, sensors/operators 11, and a bus 12.

In FIG. 1, part of the vehicle control system 1 is illustrated. The vehicle control system 1 illustrated in FIG. 1 supports the vehicle 100, which is a hybrid electric vehicle. To carry out the disclosure, however, the vehicle 100 may be another type of vehicle other than a hybrid electric vehicle.

The HEV control unit 2 controls the operation of the vehicle 100 by sending instructions to the engine control unit 3 and the motor control unit 4 based on intended driving force.

For example, based on the intended driving force, the HEV control unit 2 calculates intended engine driving force, which is driving force demanded for an engine, and intended motor driving force, which is driving force demanded for a motor generator. The HEV control unit 2 then instructs the engine control unit 3 to drive the engine based on the intended engine driving force and also instructs the motor control unit 4 to drive the motor generator based on the intended motor driving force.

In response to the instruction from the HEV control unit 2, that is, based on the intended engine driving force, the engine control unit 3 controls various actuators provided as engine-related actuators. Examples of the engine-related actuators are a throttle actuator for driving a throttle valve and various other actuators for driving the engine, such as a fuel injector.

Based on the intended engine driving force, the engine control unit 3 controls engine output by adjusting various values, such as the fuel injection timing, fuel injection pulse width, and throttle opening degree. The engine control unit 3 is also able to perform engine start/stop control.

In response to the instruction from the HEV control unit 2, that is, based on the intended motor driving force, the motor control unit 4 controls a motor driver so as to control the operation of the motor generator. The motor driver is constituted by electric circuitry including a drive circuit for the motor generator.

To operate the motor generator in a power running mode, the motor control unit 4 instructs the motor driver to operate the motor generator in the power running mode in accordance with the intended motor driving force. To operate the motor generator in a regenerative running mode, the motor control unit 4 instructs the motor driver to operate the motor generator in the regenerative running mode in accordance with the intended motor driving force.

The motor control unit 4 monitors information on the charging state (state of charge (SOC)) of a battery, which is provided in the vehicle 100 as a power source for the motor generator, so as to limit output of the motor generator based on the SOC.

The transmission control unit 5 controls various actuators provided as transmission-related actuators, based on detection signals output from certain sensors disposed in the vehicle 100 and information about the operation performed on an operator also disposed in the vehicle 100.

Examples of the transmission-related actuators are a transmission actuator for performing gear shift control of an automatic transmission of the vehicle 100 and a forward/reverse switching actuator for controlling the operation of a forward/reverse switching mechanism.

For example, the transmission control unit 5 performs gear shift control by outputting a gear shift signal to the transmission actuator in accordance with a predetermined gear shift pattern. The transmission control unit 5 also controls the forward/reverse switching actuator in response to an instruction from a driver who drives the vehicle 100 so as to switch between forward and reverse operations of the vehicle 100.

The steering control unit 6 controls the driving of a steering actuator based on the manipulation of the steering wheel by the driver so as to control the steering angle. The steering actuator is an actuator, such as a power steering motor, that can change the steering angle.

The brake control unit 7 controls various actuators provided as brake-related actuators, based on detection signals output from certain sensors disposed in the vehicle 100 and information about the operation performed on an operator also disposed in the vehicle 100.

An example of the brake-related actuators is a hydraulic pressure control actuator for controlling the pressure of a fluid output from a brake booster to a master cylinder and the pressure of a fluid in a brake fluid pipe.

The brake control unit 7 calculates the slip ratio of the wheels, based on information obtained from certain sensors, such as an axel rotational speed sensor and a vehicle speed sensor. The brake control unit 7 then causes the hydraulic pressure control actuator to increase or decrease the hydraulic pressure in accordance with the calculated slip ratio, thereby implementing antilock braking system (ABS) control.

The wireless communication control unit 8 communicates with another information processing apparatus and another information processor via a communication network, such as the Internet.

Figure 2:
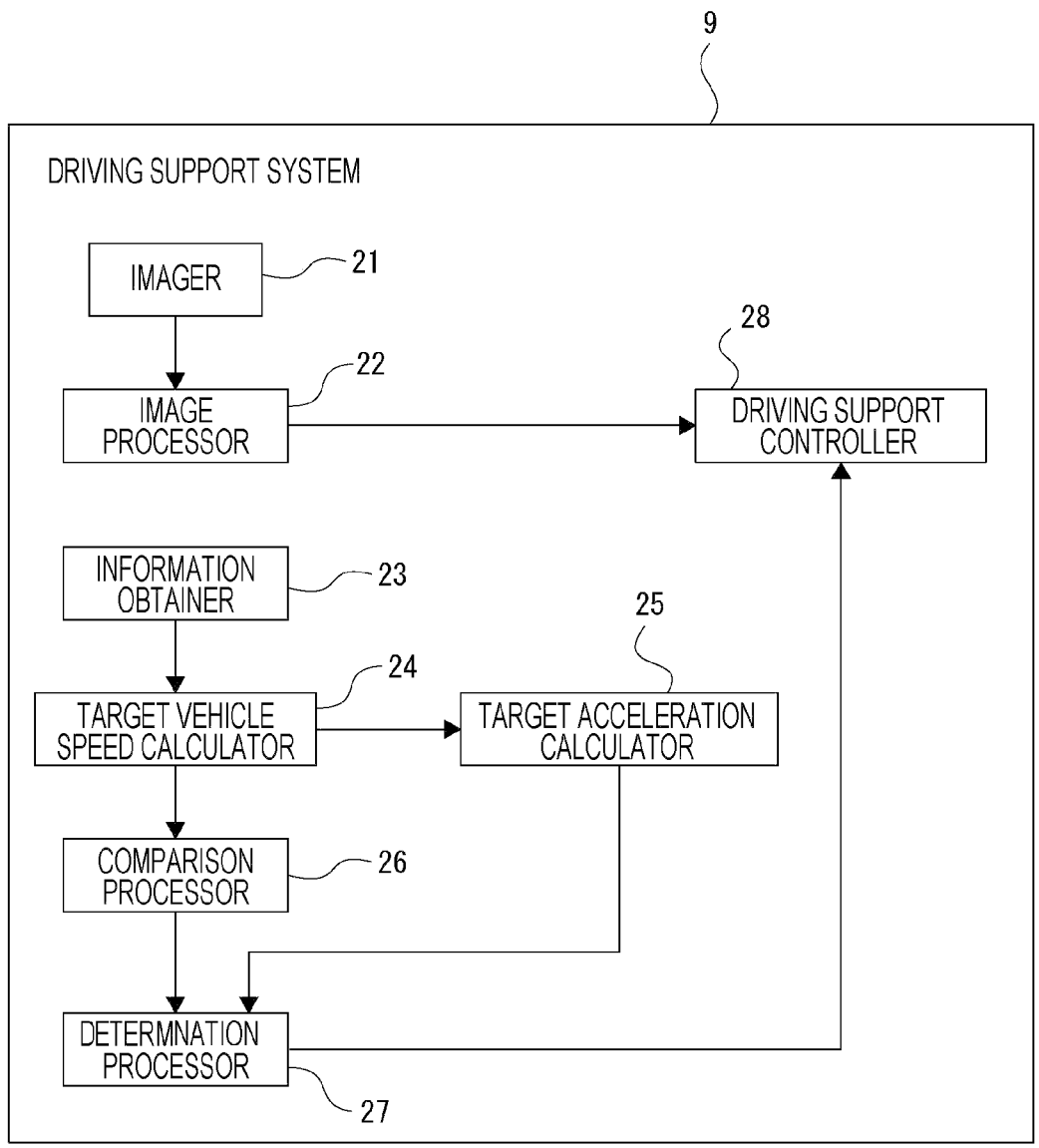
FIG. 2 is a block diagram of a driving support system.

As illustrated in FIG. 2, the driving support system 9 includes an imager 21, an image processor 22, an information obtainer 23, a target vehicle speed calculator 24, a target acceleration calculator 25, a comparison processor 26, a determination processor 27, and a driving support controller 28. The driving support system 9 executes various control operations for supporting the driving of the vehicle 100. Hereinafter such processing operations will be called driving support control processing.

The imager 21 captures an image of an object in the traveling direction of the vehicle 100 (ahead of the vehicle 100 in this embodiment) so as to generate captured image data. In this embodiment, the imager 21 includes two cameras, each of which includes a camera optical system and imaging elements, such as charge coupled devices (CCDs) and complementary metal oxide semiconductors (CMOSs). In each camera, the camera optical system forms the image of an object on the imaging plane of the imaging elements. For example, light received by each imaging element via the camera optical system is converted into an electric signal representing a pixel of the image of the object. The positions of the two cameras are determined so as to implement stereo-imaging ranging. The electric signals representing the individual pixels of the image generated in the individual cameras are subjected to analog-to-digital (A/D) conversion and predetermined correction processing and are supplied to the image processor 22 as digital image signals (captured image data). Each digital image signal represents the luminance value using a predetermined tone for a corresponding pixel.

The image processor 22 is constituted by a microcomputer including a central processing unit (CPU), a read only memory (ROM), and a random access memory (RAM) or by a digital signal processor (DSP). The image processor 22 executes predetermined image processing related to the recognition of environments outside the vehicle 100, based on the captured image data obtained from the imager 21.

For example, the image processor 22 executes various image processing operations based on the captured image data obtained by stereo imaging so as to detect a leading vehicle or an obstacle ahead of the vehicle 100.

The information obtainer 23 obtains from the locator unit 10 position information about the position of the vehicle 100 (such as a lane in which the vehicle 100 is driving, which will be called a driving lane of the vehicle 100) and reliability information indicating the reliability of the position information (which may also be called locator reliability). The information obtainer 23 is also able to obtain information about the shape and the curvature of a curve ahead of the vehicle 100. Hereinafter, information about the curvature will be called curvature information. Curvature information can be obtained for each lane.

The target vehicle speed calculator 24 calculates the target vehicle speed in each lane. For example, based on the current speed of the vehicle 100, the target vehicle speed calculator 24 estimates a position at which the vehicle 100 will be located after a certain length of time, such as five and ten seconds later (such a position will be called an estimated position), and generates curvature information about the curvature of a lane at the estimated position of the vehicle 100. The target vehicle speed calculator 24 then calculates the speeds (target vehicle speeds) at which the vehicle 100 is supposed to drive after a certain length of time, such as the speed in five seconds and that in ten seconds, based on the curvature information. As the curvature is larger, the target vehicle speed is calculated to be lower.

The target vehicle speed calculator 24 calculates, not only the target vehicle speed in a driving lane of the vehicle 100, but also the target vehicle speed in a lane on the left side and that on the right side of the driving lane (such lanes will be called a left-side adjacent lane and a right-side adjacent lane).

Five seconds and ten seconds are merely examples of the above-described certain length of time. The target vehicle speed in three seconds, for example, and that in twenty seconds, for example, may be calculated. The target vehicle speed may be calculated for one estimated position of the vehicle 100 in five seconds, for example, or for three or more estimated positions of the vehicle 100 in three, five, and ten seconds, for example.

If curvature information about a certain lane indicates an invalid value, the target vehicle speed calculator 24 does not calculate the target vehicle speed for this lane. For example, if a right-side adjacent lane does not exist, the curvature about a right-side adjacent lane is invalid.

The target acceleration calculator 25 calculates the target acceleration, based on the current speed of the vehicle 100, the target vehicle speed calculated for a certain estimated position by the target vehicle speed calculator 24, and distance information about the distance from the current position to this estimated position. The calculated target acceleration is a negative value if the vehicle 100 is to decelerate.

The target acceleration is calculated for each item of curvature information obtained by the information obtainer 23 other than invalid curvature information. It is now assumed that curvature information is obtained in the following manner. Curvature information indicating the curvature of a driving lane of the vehicle 100 in five seconds and that in ten second are obtained. Curvature information indicating the curvature of the right-side adjacent lane in five seconds and that in ten seconds are obtained. However, all items of curvature information for the left-side adjacent lane are invalid. In this case, four values are calculated as the target acceleration.

The comparison processor 26 compares the target vehicle speed after a certain length of time in the driving lane with that in each of the left-side and right-side adjacent lanes. If the target vehicle speed in five seconds and that in ten seconds have been calculated, the comparison processor 26 compares the target vehicle speed in five seconds in the driving lane with that in each of the left-side and right-side adjacent lanes, and also compares the target vehicle speed in ten seconds in the driving lane with that in each of the left-side and right-side adjacent lanes.

If curvature information in a certain lane is invalid and the target vehicle speed in this lane is not calculated, the comparison processor 26 does not make a comparison between the driving lane and this lane.

If the difference between the target vehicle speed in the driving lane and that in an adjacent lane (one of the left-side and right-side adjacent lanes) is greater than or equal to a predetermined value, the determination processor 27 determines that a road branches off from the driving lane ahead of the vehicle 100. If it is found that a road branches off ahead of the vehicle 100, the determination processor 27 also determines whether the vehicle 100 has entered a lane whose target vehicle speed is low. This determination processing will be discussed later in detail.

The driving support controller 28 executes various processing operations, such as autocruise control, for supporting the driver in driving. In this embodiment, in one example, the driving support controller 28 performs deceleration control before the vehicle 100 enters a curve, which will simply be called curve deceleration control.

For example, when the vehicle 100 gets off a highway to a local road at an interchange, it first runs in a slip lane branching off from a main lane on the highway and then joins a local road.

While the vehicle 100 is continuing running in a main lane on a highway, it can drive within the speed limit on the highway. The curvature of a slip lane is usually greater than that of a main lane, and if the vehicle 100 is running in a main lane leading to a slip lane, it eventually slows down to enter the slip lane.

It is thus desirable that curve deceleration control be not performed if it is determined that the vehicle 100 is continuing driving in a main lane and that curve deceleration control be performed if it is determined that the vehicle 100 is entering a road branching off from a main lane.

However, it may be possible that the determination processor 27 wrongly determines that the vehicle 100 has entered a branching road even though it is still driving in a main lane. In this case, the driving support controller 28 may perform unwanted curve deceleration control.

In this embodiment, the driving support controller 28 performs curve deceleration control only in an appropriate situation. This will be discussed later in detail.

The driving support system 9 may be constituted by an imaging device and an information processor. The imaging device includes the imager 21 and the image processor 22 integrally formed together. The information processor is constituted by the information obtainer 23, the target vehicle speed calculator 24, the comparison processor 26, the determination processor 27, and the driving support controller 28, which are implemented by a program, for example. Alternatively, the imaging device may include the imager 21, while the information processor may be constituted by the image processor 22, the information obtainer 23, the target vehicle speed calculator 24, the comparison processor 26, the determination processor 27, and the driving support controller 28, which are implemented by a program, for example. The imager 21 and the image processor 22 integrally may be detachable or permanently affixed. An information processor forming the image processor 22 may be separately provided from that forming the remaining elements.

Such an information processor is constituted by a microcomputer including a CPU, a ROM, and a RAM, for example. The information processor executes driving support control processing, based on image processing results obtained by the image processor 22, detection information obtained by the sensors/operators 11, and input operation information.

The driving support system 9 is coupled via the bus 12 to each of control units such as the HEV control unit 2, the engine control unit 3, the motor control unit 4, and the brake control unit 7, which are each constituted by a microcomputer. The driving support system 9 and these control units can perform data communication with each other. The driving support controller 28 instructs some of these control units to execute certain processing related to driving support.

Referring back to a description of the vehicle control system 1 in FIG. 1, the locator unit 10 includes a map locator calculator and a high-precision road map database, which serves as a storage. The map locator calculator is constituted by a microcomputer including a CPU, a RAM, a ROM, and a non-volatile storage.

The map locator calculator receives positioning signals transmitted from multiple satellites used in a global navigation satellite system (GNSS) and calculates the position of the vehicle 100. In environments where positioning signals do not reach the vehicle 100, such as in a tunnel, the position of the vehicle 100 is determined, based on output signals from sensors, such as a vehicle speed sensor, an acceleration sensor, and an angular velocity sensor. The position of the vehicle 100 may be determined as a result of the vehicle 100 communicating with a roadside unit or another vehicle.

The locator unit 10 is able to output position information of the vehicle 100 and locator reliability indicating the reliability of the position information.

In the example described below, the locator reliability is represented in a range of 0 (lowest reliability) to 3 (highest reliability). However, this is merely an example. The locator reliability may be represented as flag information indicating 0 (not reliable) or 1 (reliable), or may be represented in multiple levels, such as in 10 or 100 levels.

The sensors/operators 11 include various sensors and operators provided in the vehicle 100. Examples of the sensors/operators 11 are a vehicle speed sensor 11a, an accelerator opening degree sensor 11b, and a turn signal switch 11c. The vehicle speed sensor 11a outputs a signal indicating the speed of the vehicle 100. The accelerator opening degree sensor 11b detects the accelerator opening degree based on the amount by which the accelerator pedal is stepped on. The turn signal switch 11c causes a turn signal lamp (also called a direction indicator lamp) to blink, for example.

The vehicle 100 also have other sensors which are not illustrated in FIG. 1. Examples of such sensors are as follows. A brake sensor detects the amount by which the brake pedal is stepped on. A motion sensor detects the motion of the vehicle 100 by using an acceleration sensor and an angular velocity sensor, for example. A steering angle sensor detects the steering angle of the steering wheel. An engine speed sensor detects the speed of the engine. An air intake amount sensor detects the amount of air supplied to the engine. A throttle opening degree sensor detects the opening degree of a throttle valve that is disposed on an air intake passage to adjust the amount of air intake to be supplied to each cylinder of the engine. A coolant temperature sensor detects the coolant temperature, which is the engine temperature. An outdoor temperature sensor detects the temperature outside the vehicle 100. A gradient sensor detects the gradient of a road where the vehicle 100 is driving.

A procedure for executing curve deceleration control processing by the driving support system 9 will be described below.

The driving support system 9 performs curve deceleration control when the vehicle 100 is approaching a sharp curve. This can prevent the vehicle 100 from entering the curve at a high speed, thereby contributing to safety improvement.

It is now assumed that the vehicle 100 is driving on a highway. It may be possible that the driving support system 9 wrongly determine that the vehicle 100 has entered a slip lane leading to a local road even though it is still driving in a main lane on the highway. In this case, if the driving support system 9 performs curve deceleration control, the vehicle 100 slows down inappropriately.

An example of a processing procedure for performing appropriate curve deceleration control without performing the above-described unsuitable control will be explained below with reference to FIGS. 3 through 15.

Processing illustrated in each of the individual flowcharts is executed by a controller, such as a CPU, of the driving support system 9. In the following description, the controller of the driving support system 9 will simply be called the controller.

The following processing operations are executed by the controller intermittently at intervals of several milliseconds to several hundreds of milliseconds.

The overall procedure of each processing operation executed by the controller will first be explained below with reference to the flowchart of FIG. 3.

In step S001, the controller executes target vehicle speed calculation processing. In this processing, the controller calculates, not only the target vehicle speed of the vehicle 100 in a driving lane, but also the vehicle speed in an adjacent lane.

Then, in step S002, the controller determines whether to use information about the adjacent lane to perform curve deceleration control. For example, if the controller has detected that the driver is intending to change lanes, it determines that information about the adjacent lane will be used.

In step S003, the controller executes target acceleration calculation processing. In this processing, the controller calculates, not only the target acceleration in the driving lane, but also that in the adjacent lane (one of the left-side and right-side adjacent lanes). The use of information about this adjacent lane has been determined in step S002.

In step S004, the controller executes low-speed lane entering determination processing to determine whether the vehicle 100 is entering a lane to be driven at low speed. In this processing, if it is found that the driving lane is divided ahead of the vehicle 100 into a lane to be driven at high speed (hereinafter may be called a high-speed lane) and a lane to be driven at low speed (hereinafter may be called a low-speed lane), the controller determines whether the vehicle 100 is entering the low-speed lane. If the vehicle 100 is found to be entering the low-speed lane, curve deceleration control is desirably performed.

In step S005, the controller executes route switching determination processing. In this processing, the controller determines whether the vehicle 100 has changed lanes to switch the driving route.

In step S006, the controller performs curve deceleration control execution determination processing to determine whether to execute curve deceleration control. In this processing, the controller performs curve deceleration control as a result of the vehicle 100 having changed lanes to enter a low-speed lane from a high-speed lane. The controller also determines whether to perform curve deceleration control. This can prevent the execution of unwanted curve deceleration control if position information about the vehicle 10 estimated based on information obtained from the locator unit 10 is wrong. For example, if the controller has wrongly determined that the vehicle 100 has entered a low-speed lane even though it is actually driving in a high-speed lane, the controller prevents the execution of curve deceleration control.

Examples of the individual processing operations in steps S001 through S006 will be described below.

An example of target vehicle speed calculation processing will be discussed below with reference to the flowchart of FIG. 4.

In step S101, the controller obtains curvature information about the curvature of a certain position. Examples of the certain position will be explained below with reference to FIG. 5.

The current position of the vehicle 100 is assumed to be a current position P0. The estimated position of the vehicle 100 in the driving lane in five seconds based on the vehicle speed is assumed to be an estimated position P5. Likewise, the estimated position of the vehicle 100 in the driving lane in ten seconds is assumed to be an estimated position P10.

The estimated position in the left-side adjacent lane in five seconds is assumed to be an estimated position PL5, while that in ten seconds is assumed to be an estimated position PL10.

The estimated position in the right-side adjacent lane in five seconds is assumed to be an estimated position PR5, while that in ten seconds is assumed to be an estimated position PR10.

Figure 4:
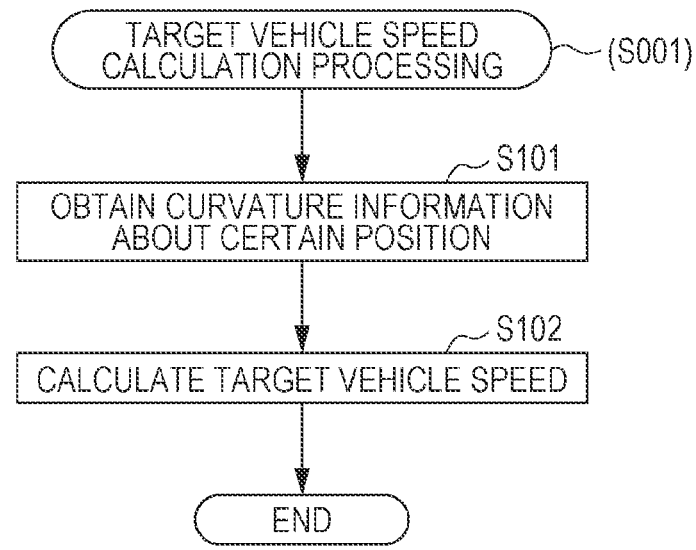
FIG. 4 is a flowchart illustrating an example of target vehicle speed calculation processing.
Figure 5:
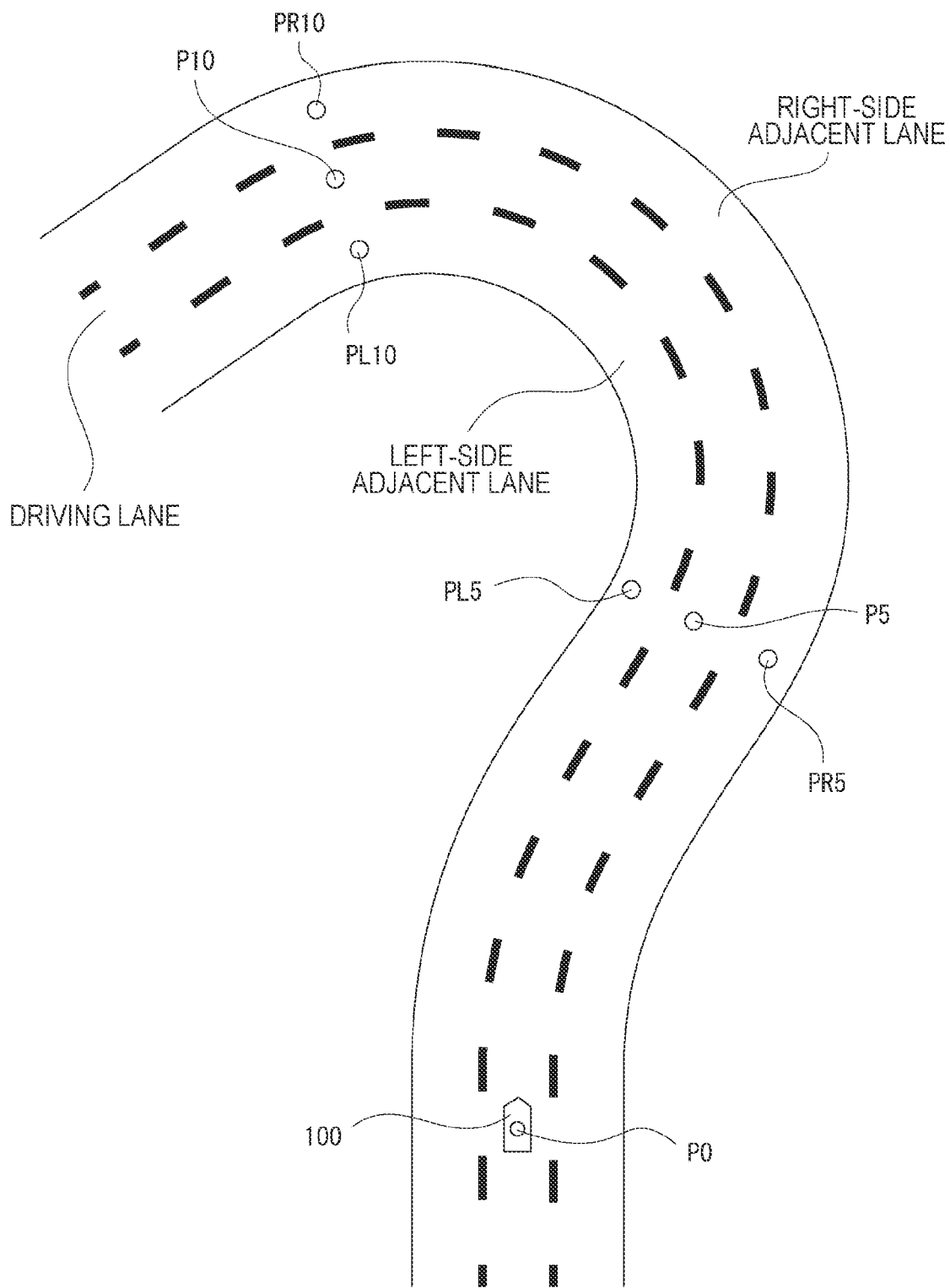
FIG. 5 schematically illustrates examples of a certain position.

In step S101 in FIG. 4, curvature information and locator reliability about the driving lane at the estimated positions P5 and P10, those about the left-side adjacent lane at the estimated positions PL5 and PL10, and those about the right-side adjacent lane at the estimated positions PR5 and PR10 are obtained from the locator unit 10. That is, in the example in FIG. 5, six items of curvature information and locator reliability levels at the six positions are obtained.

The number of items of information to be obtained becomes different depending on the situation of a road. For example, in a two-lane road, four items of information and locator reliability levels at four positions are obtained. In a one-lane road, two items of information and locator reliability levels at two positions are obtained.

Curvature information about a lane which does not exist is obtained as an invalid value, for example. Even between positions on the same lane, such as between the estimated positions PR5 and PR10 in the right-side adjacent lane, curvature information about one position may be an invalid value, while that about the other position may be a normal value.

Then, in step S102 in FIG. 4, the controller calculates the target vehicle speed. The target vehicle speed is calculated for each of the estimated positions whose curvature information indicates a normal value.

The target vehicle speed may be calculated according to a mathematical expression using the curvature as a variable or from a table in which target vehicle speeds and curvatures are associated with each other. The target vehicle speed may be calculated or obtained based on the radius of a curve, which is the reciprocal of the curvature.

If curvature information is invalid, the target vehicle speed is neither calculated nor obtained.

Adjacent-lane information use determination processing is executed by the controller to determine whether to use information about a lane other than the driving lane of the vehicle 100 when performing curve deceleration control. For example, when the driver operates the vehicle 100 to change from the driving lane to the left-side adjacent lane, the controller detects this operation performed on the vehicle 100 and determines whether to use information about the left-side adjacent lane.

Figure 6:
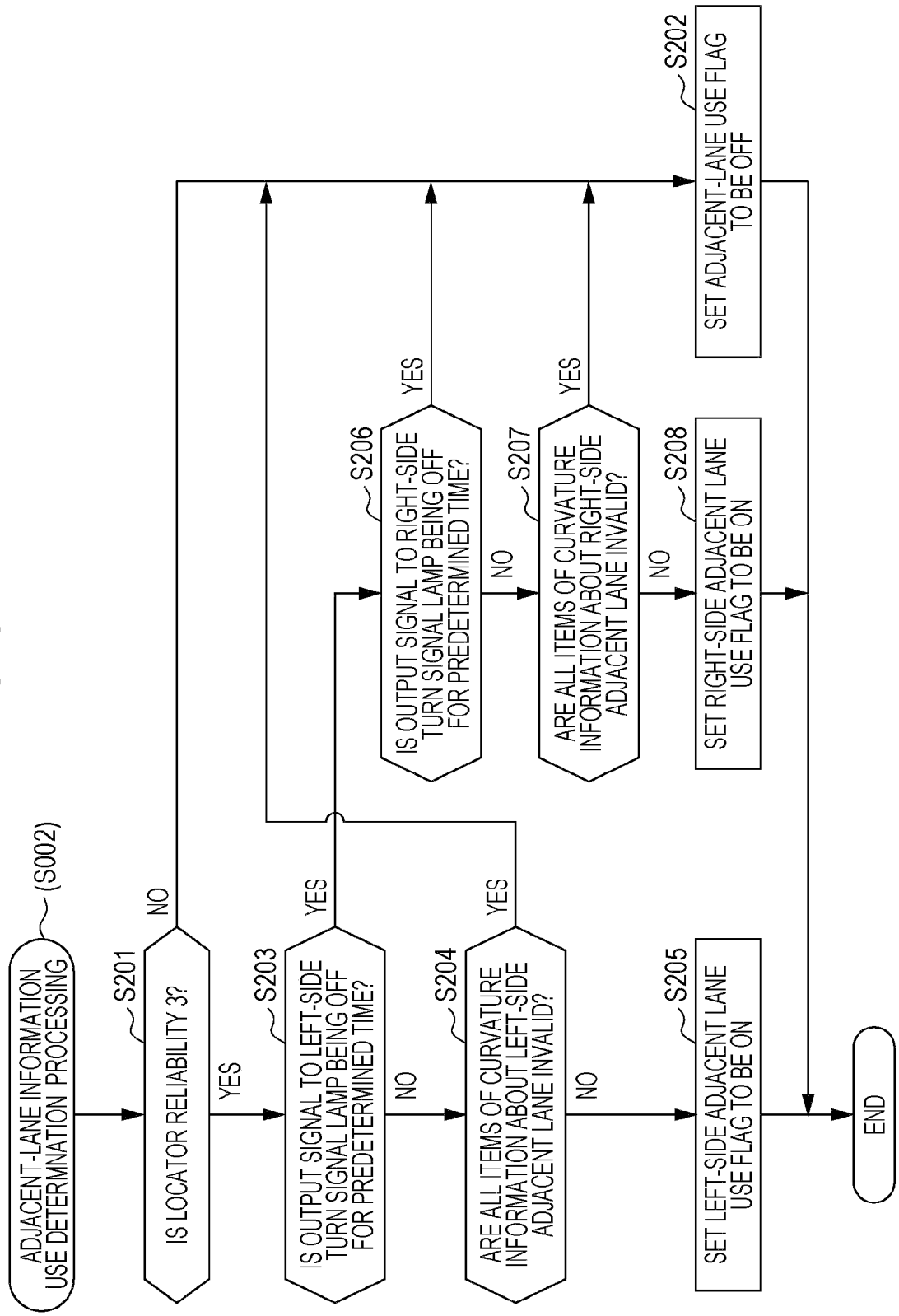
FIG. 6 is a flowchart illustrating an example of adjacent-lane information use determination processing.

An example of this processing is illustrated in FIG. 6.

In step S201, the controller determines whether the locator reliability is 3. If the locator reliability is 3, it means that the driving lane of the vehicle 100 has been identified, and the error of the estimated position is smaller than 1 m. If the locator reliability is 2, it means that the driving lane of the vehicle 100 has not been identified, but the road (a highway name, for example) on which the vehicle 100 is driving has been specified.

If the locator reliability is found to be 2 or lower in step S201, it means that the driving lane of the vehicle 100 has not been identified. In this case, in step S202, the controller sets an adjacent-lane use flag to be OFF.

Figure 7:
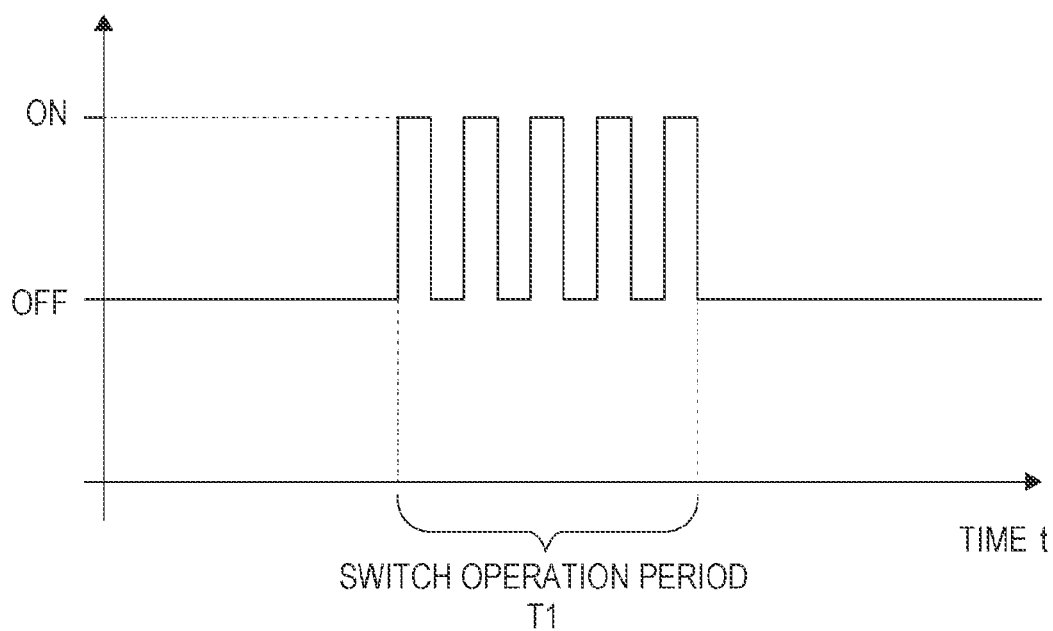
FIG. 7 is a diagram illustrating an example of an output signal to a turn signal lamp.

If the locator reliability is found to be 3 in step S201, the controller determines in step S203 whether an output signal to the left-side turn signal lamp is being OFF for a predetermined time. An example of the output signal to the turn signal lamp is illustrated in FIG. 7.

The state of an output signal to the turn signal lamp is based on how the driver is manipulating the turn signal switch 11c. While the driver is not manipulating the turn signal switch 11c, the output signal is OFF. During the switch operation period T1 for which the driver is operating the turn signal switch 11c, the output signal is switched between ON and OFF at intervals of several hundreds of milliseconds, for example.

The predetermined time in step S203 is longer than the length of time (several hundreds of milliseconds) for which the output signal is OFF during the switch operation period T1 but is not much longer than that. In one example, the predetermined time is set to be two seconds. That is, the predetermined time is set so that the result of step S203 becomes NO during the switch operation period T1 and the result becomes YES after the lapse of a certain time after the switch operation period T1 has finished.

That is, step S203 is executed to determine whether the turn signal switch 11c is in a state of being operating or having just been operated by the driver to switch the left-side turn signal lamp ON.

If the result of step S203 is NO, that is, if it is found that the driver is operating or has just operated the turn signal switch 11c to switch the left-side turn signal lamp ON, the process proceeds to step S204. In step S204, the controller determines whether all items of curvature information about the left-side adjacent lane are invalid.

If all items of curvature information about the left-side adjacent lane are invalid, namely, if the items of curvature information about the left-side adjacent lane at the estimated positions PL5 and PL10 are invalid even though the left-side turn signal lamp is turned ON, there is no information to be used. The controller thus sets the adjacent-lane use flag to be OFF in step S202.

If any item of curvature information about the left-side adjacent lane indicates a normal value, the controller sets a left-side adjacent lane use flag to be ON in step S205. That is, if the locator reliability is sufficiently high so that the driving lane of the vehicle 100 can be specified, and if the controller has detected that the driver is intending to change the driving lane to the left-side adjacent lane, and if any item of curvature information about the left-side adjacent lane indicates a normal value, the left-side adjacent lane use flag is set to be ON.

If it is found in step S203 that the output signal to the left-side turn signal lamp is being OFF for the predetermined time, the controller executes steps S206 and S207 for the right-side adjacent lane, which are similar to steps S203 and S204 for the left-side adjacent lane. If the results of steps S206 and S207 are NO, the controller sets a right-side adjacent lane use flag to be ON in step S208.

In step S206, the controller determines whether an output signal to a right-side turn signal lamp is being OFF for a predetermined time (two seconds, for example).

If it is found that the output signal is not being OFF for the predetermined time, the controller determines in step S207 whether all items of curvature information about the right-side adjacent lane are invalid.

If all items of curvature information about the right-side adjacent lane are invalid, namely, if the items of curvature information about the right-side adjacent lane at the estimated positions PR5 and PR10 are invalid even though the right-side turn signal lamp is turned ON, there is no information to be used. The controller thus sets the adjacent-lane use flag to be OFF in step S202. This setting processing in step S202 indicates that neither of information about the left-side adjacent lane nor that about the right-side adjacent lane is used.

If any item of curvature information about the right-side adjacent lane indicates a normal value, the controller sets the right-side adjacent lane use flag to be ON in step S208. That is, if the locator reliability is sufficiently high so that the driving lane of the vehicle 100 can be specified, and if the controller has detected that the driver is intending to change the driving lane to the right-side adjacent lane, and if any item of curvature information about the right-side adjacent lane indicates a normal value, the right-side adjacent lane use flag is set to be ON.

As described above, in the adjacent-lane information use determination processing, it is determined whether information about an adjacent lane is to be used and can be used. If the information is to be and can be used, the adjacent-lane use flag is turned ON.

In the following description, if the adjacent-lane use flag is ON, it means that either one of the left-side adjacent lane use flag and the right-side adjacent lane use flag is ON. If the adjacent-lane use flag is OFF, it means that both of the left-side adjacent lane use flag and the right-side adjacent lane use flag are OFF.

Figure 8:
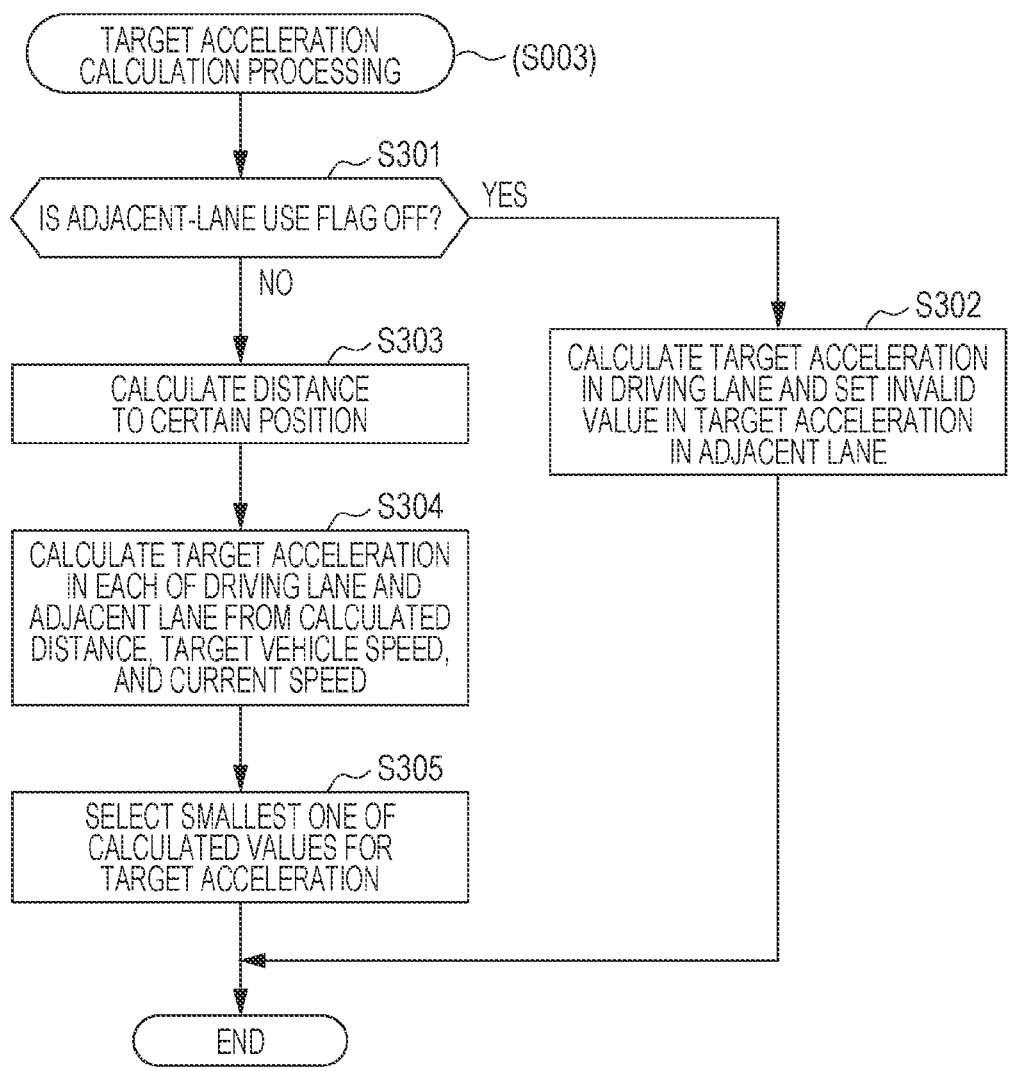
FIG. 8 is a flowchart illustrating an example of target acceleration calculation processing.

An example of target acceleration calculation processing will be discussed below with reference to FIG. 8.

In step S301, the controller determines whether the adjacent-lane use flag is OFF. If the adjacent-lane use flag is OFF, deceleration control based on information about an adjacent lane is not performed, and the controller proceeds to step S302. In step S302, the controller calculates the target acceleration in the driving lane and also sets an invalid value in the target acceleration in the adjacent lane. In this case, the target acceleration is set based on curvature information about the driving lane, for example.

If the adjacent-lane use flag is not OFF, that is, if one of the left-side adjacent lane use flag and the right-side adjacent lane use flag is ON, the controller calculates the distance to a certain position on the adjacent lane in step S303.

For example, if the left-side adjacent lane use flag is ON, the controller calculates the distance to the estimated position PL5 and that to the estimated position PL10. Regarding an estimated position whose curvature information has not been obtained, the controller does not calculate the distance to this position.

Then, in step S304, the controller calculates the target acceleration for each of the estimated positions, based on the distance calculated in step S303, the target vehicle speed calculated in step S001, and the current speed of the vehicle 100. The target acceleration is calculated for each of the estimated positions on the driving lane of the vehicle 100 and for each of the estimated positions on the adjacent lane.

Then, in step S305, the controller selects the smallest one of the calculated values for the target acceleration. For example, if the acceleration to achieve the target vehicle speed at each of the estimated positions P5 and P10 in the driving lane is −5 and if the left-side adjacent lane use flag is ON and the acceleration to achieve the target vehicle speed at the estimated position PL5 in the left-side adjacent lane is −10 and that at the estimated position PL10 in the left-side adjacent lane is −20, the controller 20 selects −20, which is the smallest value for the calculated acceleration. In this example, the target acceleration is represented by a positive value in the case of acceleration, and is represented by a negative value in the case of deceleration. The unit of the acceleration is kilometer per hour per second (km/h/s).

In step S305, the highest level of deceleration is selected.

As described above, in target acceleration calculation processing, the lowest value is selected as the target acceleration in step S302 or S305.

In low-speed lane entering determination processing in step S004, if it is found that the driving lane is divided ahead of the vehicle 100 into a lane to be driven at high speed (hereinafter may be called a high-speed lane) and a lane to be driven at low speed (hereinafter may be called a low-speed lane), the controller determines whether the vehicle 100 is entering the low-speed lane. This processing is executed for performing curve deceleration control more appropriately.

Figure 9:
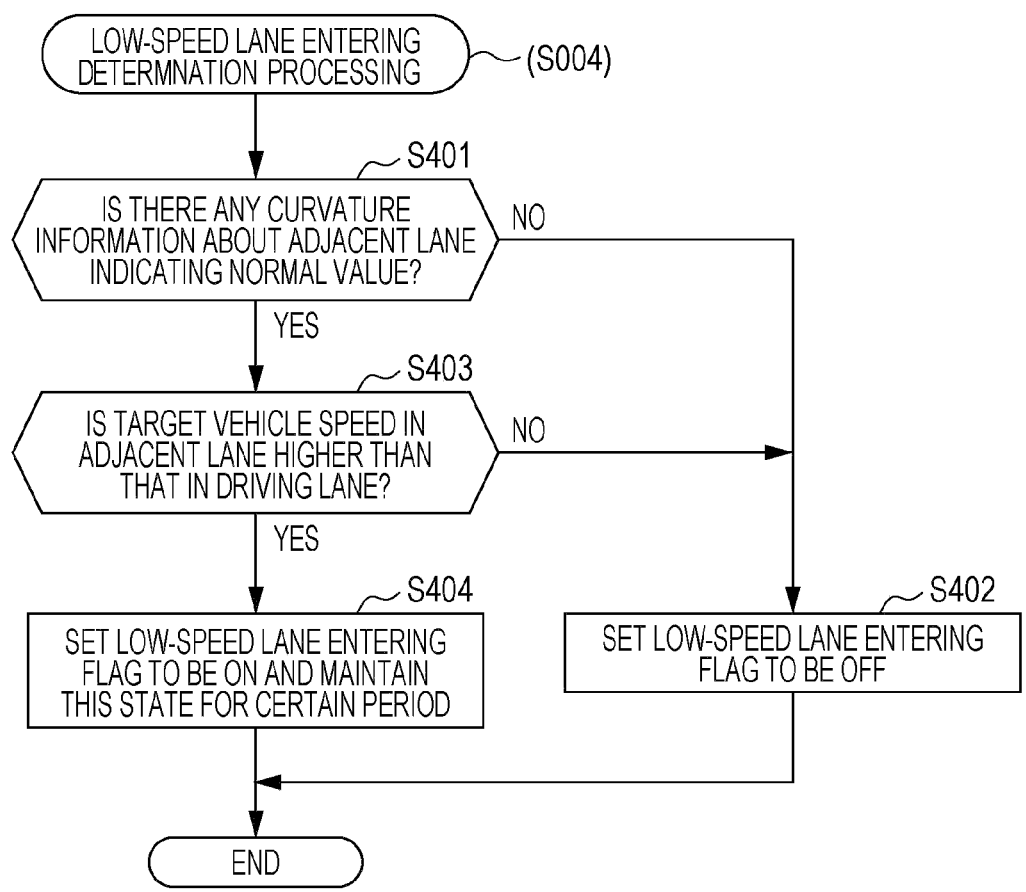
FIG. 9 is a flowchart illustrating an example of low-speed lane entering determination processing.

An example of low-speed lane entering determination processing will be discussed below with reference to FIG. 9.

In step S401, the controller determines whether curvature information about an adjacent lane which indicates a normal value is available. If all items of curvature information about adjacent lanes are invalid, the controller proceeds to step S402 and sets a low-speed lane entering flag to be OFF.

If curvature information about an adjacent lane indicating a normal value is found in step S401, the controller proceeds to step S403. In step S403, the controller determines whether the target vehicle speed in this adjacent lane is higher than that in the driving lane by a value greater than or equal to a predetermined threshold. The target vehicle speed has been calculated in step S001 for each of the estimated positions whose curvature information indicates a normal value. That is, in step S403, the target speeds calculated in step S001 are compared with each other.

Step S403 is executed for each of the estimated positions. For example, if the driving lane is sandwiched between a left-side adjacent lane and a right-side adjacent lane, the target vehicle speed at the estimated position P5 is compared with that at each of the estimated positions PL5 and PR5, while the target vehicle speed at the estimated position P10 is compared with that at each of the estimated positions PL10 and PR10.

For example, the controller determines in step S403 whether any of the target vehicle speeds in the adjacent lanes is higher than that in the driving lane by a value greater than or equal to the predetermined threshold. If even one of such target vehicle speeds is found, the result of step S403 is YES.

If none of the target vehicle speeds in the adjacent lanes are higher than that in the driving lane by a value greater than or equal to the predetermined threshold, the result of step S403 is NO.

In other words, step S403 is processing for determining whether a road branches off ahead of the vehicle 100 and also for determining whether there is a possibility that the vehicle 100 be to decelerate more rapidly in this branching road than in an adjacent lane.

As the above-described predetermined threshold, a predetermined threshold Th5 used for comparing the target vehicle speed at the estimated position P5 with that at the estimated position PL5 and that at the estimated position PR5 may be different from a predetermined threshold Th10 used for comparing the target vehicle speed at the estimated position P10 with that at the estimated position PL10 and that at the estimated position PR10.

For example, the predetermined threshold Th5 may be 20 km/h, while the predetermined threshold Th10 may be 40 km/h.

If the result of step S403 is NO, the controller sets the low-speed lane entering flag to be OFF in step S402.

If the result of step S403 is YES, it is possible that the controller perform curve deceleration control to slow down the vehicle 100 more rapidly than in the adjacent lane if the vehicle 100 keeps running at the current speed. In this case, in step S404, the controller sets the low-speed lane entering flag to be ON and maintains this state for a certain period (five seconds, for example).

Step S404 is executed at intervals of several hundreds of milliseconds or shorter unless the vehicle 100 changes lanes. The low-speed lane entering flag is thus maintained to be ON unless the situation is changed. In other words, the low-speed lane entering flag is not necessarily changed to be OFF after five seconds.

As described above, in the low-speed lane entering determination processing, it is determined whether the vehicle 100 has entered a lane to be driven at lower speed than in an adjacent lane.

Figure 10:
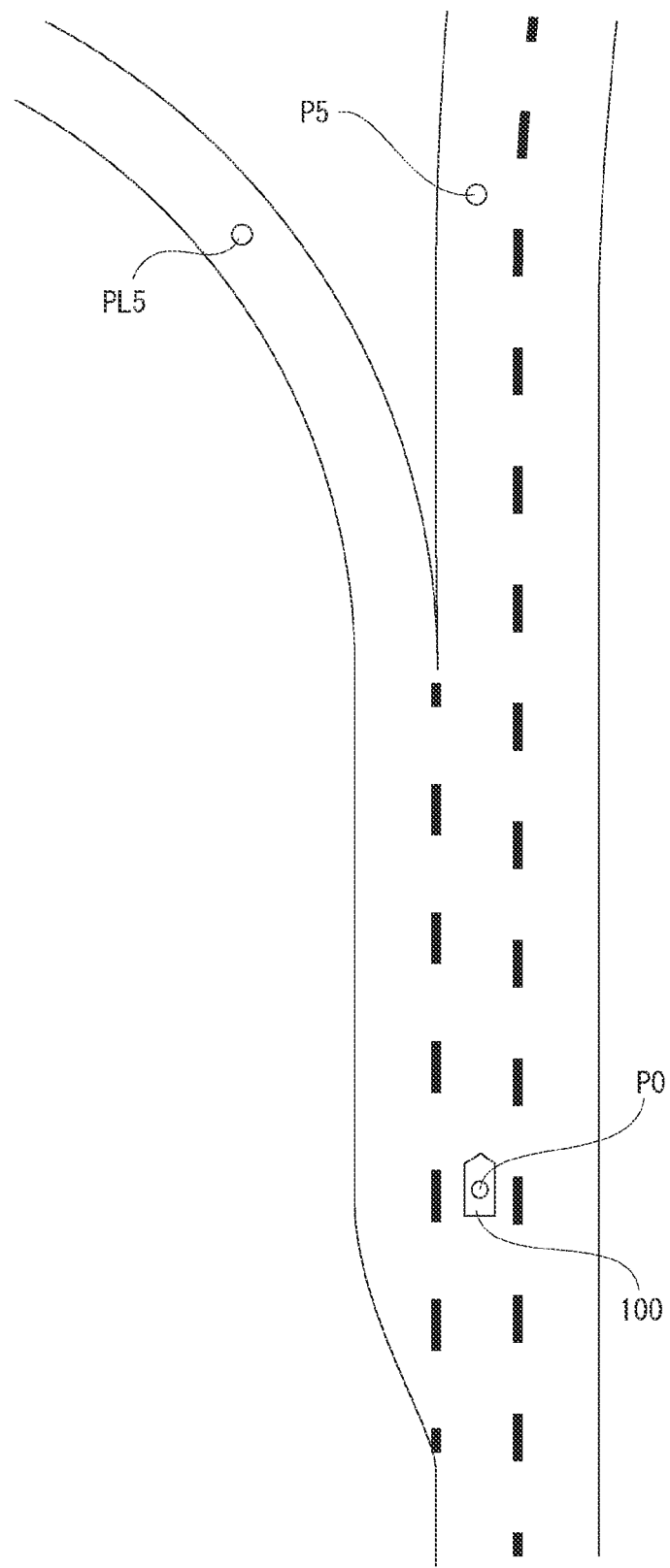
FIG. 10 schematically illustrates an example of the situation of a vehicle and a road.

An example of the situation of the vehicle 100 and the road where step S402 is executed is illustrated in FIG. 10.

If, as illustrated in FIG. 10, the target vehicle speed at the estimated position P5 ahead of the current position of the vehicle 100 is higher than that at the estimated position PL5 of the left-side adjacent lane, which is ahead of the position on the left side of the current position of the vehicle 100, step S402 is executed.

Figure 11:
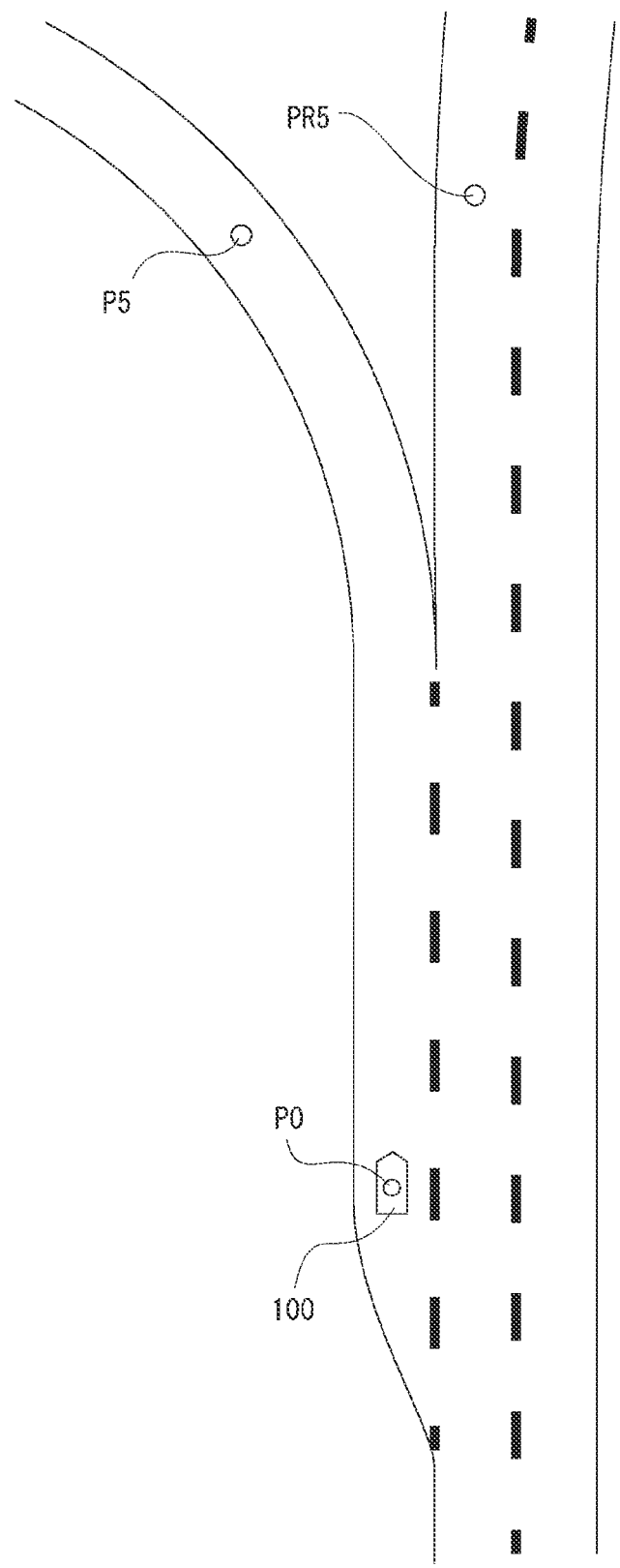
FIG. 11 schematically illustrates another example of the situation of a vehicle and a road.

An example of the situation of the vehicle 100 and the road where step S404 is executed is illustrated in FIG. 11.

If, as illustrated in FIG. 11, the target vehicle speed at the estimated position P5 ahead of the current position of the vehicle 100 is lower than that at the estimated position PR5 of the right-side adjacent lane, which is ahead of the position on the right side of the current position of the vehicle 100, step S404 is executed.

In the situation in FIG. 11, it is desirable that the driving support system 9 of the vehicle 100 perform curve deceleration control. Nevertheless, if the accuracy of position information about the position of the vehicle 100 obtained from the locator unit 10 is low, the driving support system 9 may wrongly determine that the vehicle 100 is running in the left-side lane (situation in FIG. 11) even though the vehicle 10 is actually running in the center lane (situation in FIG. 10). In such a case, it is inappropriate that the driving support system 9 perform curve deceleration control.

In the following processing, the driving support system 9 performs curve deceleration control in the situation in FIG. 11, and does not perform curve deceleration control if it mistakes the situation in FIG. 10 for that in FIG. 11. Details of curve deceleration control processing will be discussed later.

In route switching determination processing in step S005, the controller determines whether the driving route has been switched as a result of the vehicle 100 having changed lanes. Switching of the driving route does not mean mere changing of lanes, but means changing of roads. For example, on a three-lane highway, the vehicle 100 changes from the center lane to the left-side lane so as to switch the driving route from the highway to a local road via a slip lane.

Figure 12:
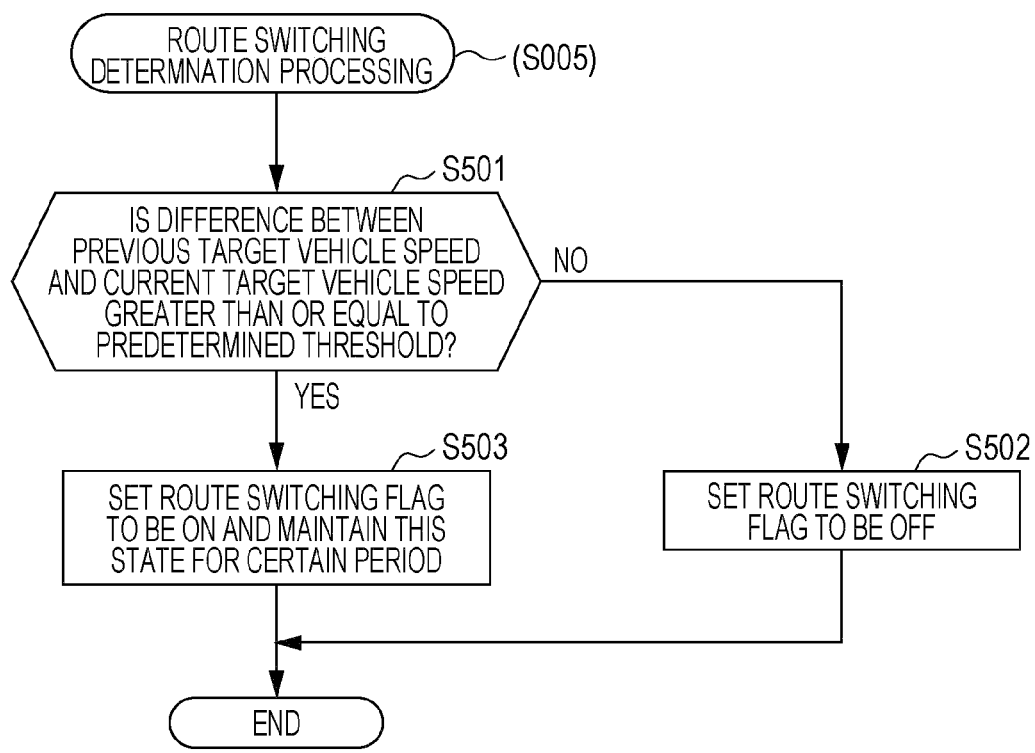
FIG. 12 is a flowchart illustrating an example of route switching determination processing.

An example of route switching determination processing will be described below with reference to FIG. 12.

In step S501, the controller determines whether the difference between the previous target vehicle speed in the driving lane of the vehicle 100 and the current target vehicle speed is greater than or equal to a predetermined threshold.

The previous target vehicle speed and the current target vehicle speed will be explained below.

As stated above, steps S001 through S006 are executed at intervals of several milliseconds to several hundreds of milliseconds. That is, target vehicle speed calculation processing in step S001 is repeatedly executed at certain intervals, and the target vehicle speed is accordingly calculated at certain intervals and for each of the estimated positions.

The current target vehicle speed is the speed calculated in step S001 in the current cycle of steps S001 through S006. The previous target vehicle speed is the speed calculated in step S001 in the previous cycle, which is one before the current cycle.

Figure 13:
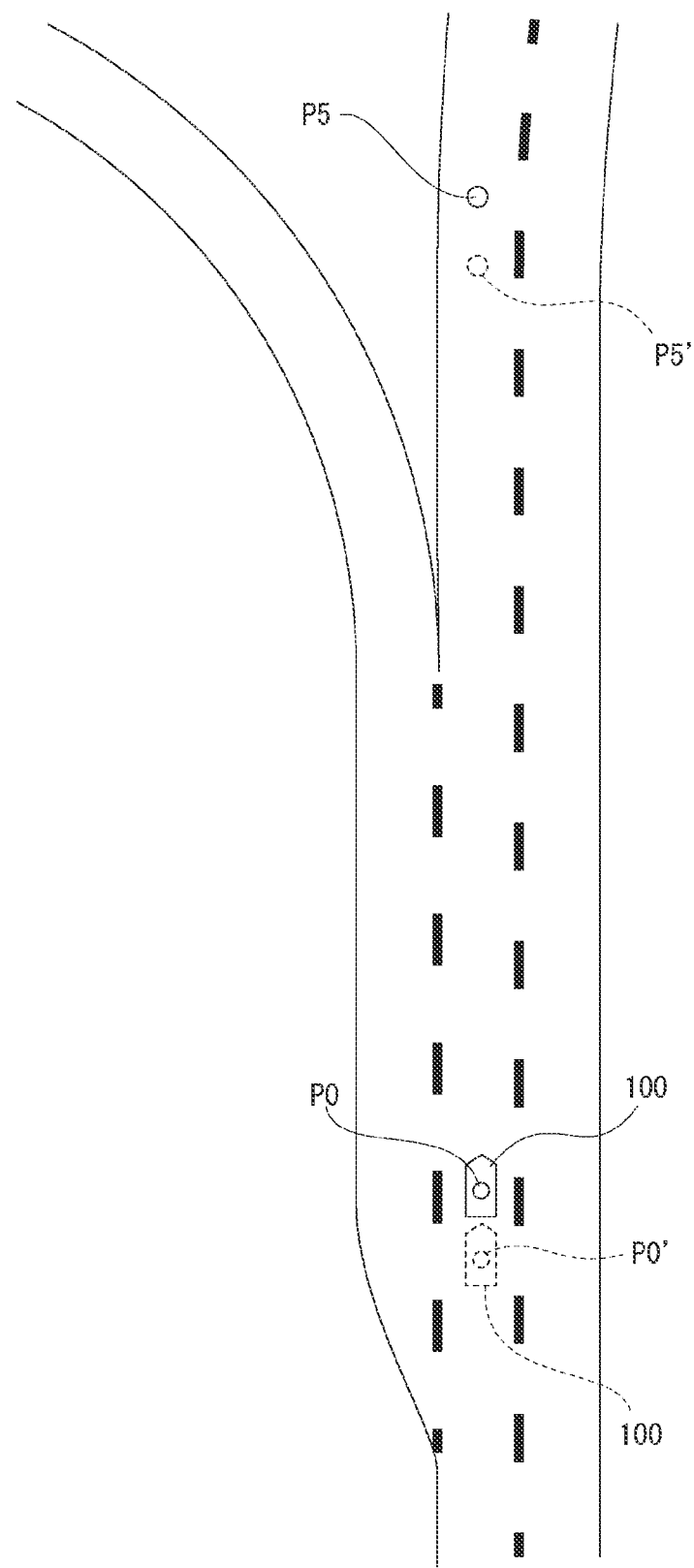
FIG. 13 schematically illustrates how much the current target vehicle speed is changed from the previous target vehicle speed if a vehicle has not changed lanes.

A description will be given, with reference to FIG. 13, of how much the current target vehicle speed is changed from the previous target vehicle speed if the vehicle 100 has not changed lanes.

The position of the vehicle 100 when step S001 was executed last time is assumed to be a position P0' and the estimated position of the vehicle 100 in five seconds is assumed to be a position P5'. As illustrated in FIG. 13, since the vehicle 100 has not changed lanes, the position P5, which is estimated based on the current position P0 of the vehicle 100, when step S001 is executed this time, is not considerably separated from the previously estimated position P5'. Accordingly, the curvature of the currently estimated position P5 is not significantly different from that of the previously estimated position P5', and there is a small difference between the target vehicle speed at the position P5 and that at the position P5'.

A description will now be given, with reference to FIG. 14, of how much the current target vehicle speed is changed from the previous target vehicle speed if the vehicle 100 has changed lanes.

Figure 14:
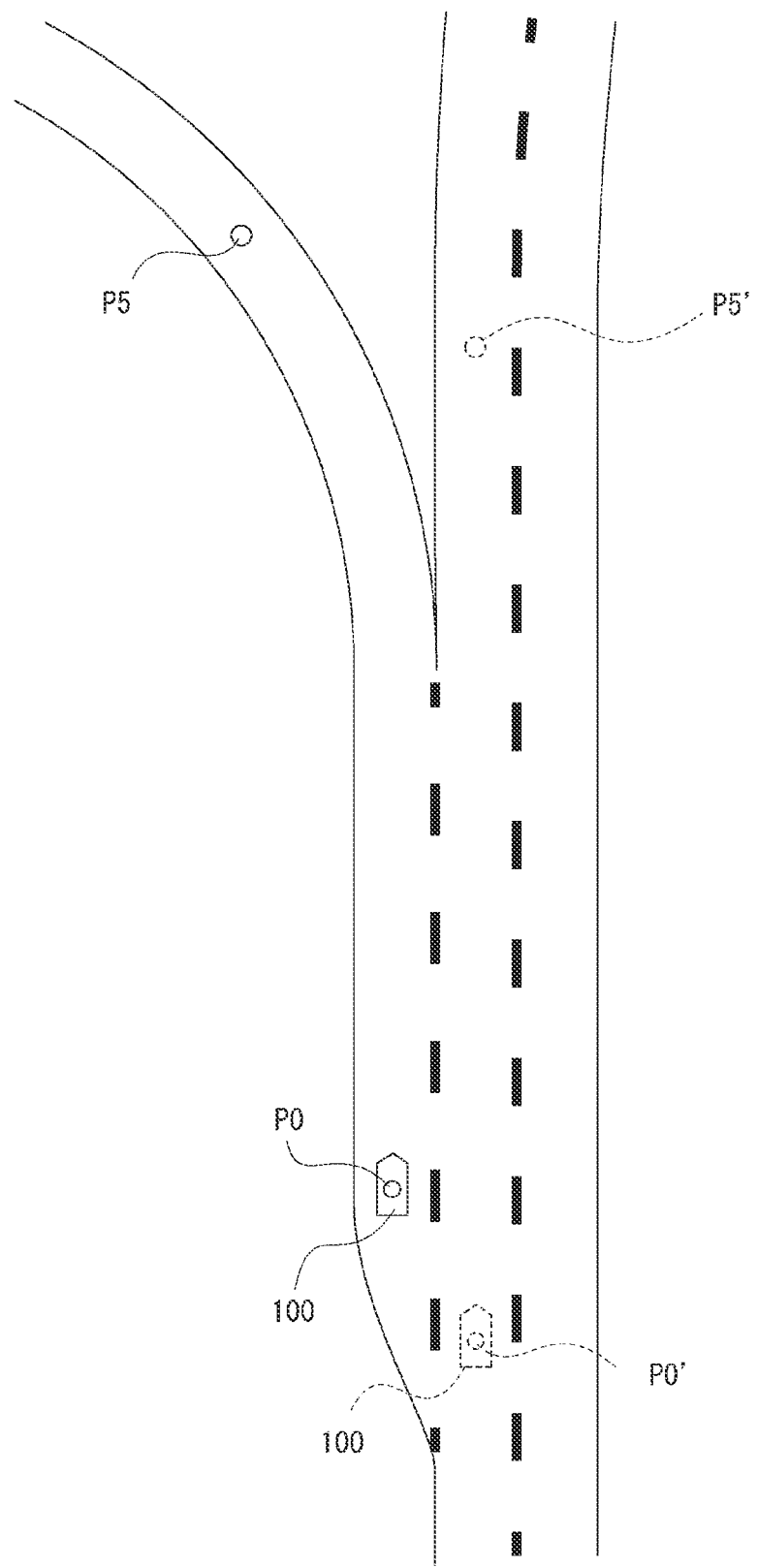
FIG. 14 schematically illustrates how much the current target vehicle speed is changed from the previous target vehicle speed if a vehicle has changed lanes.

As illustrated in FIG. 14, as a result of the vehicle 100 having changed from the center lane to the left-side lane on a three-lane highway, the currently estimated position P5 is on a slip lane, while the previously estimated position P5' is on a main lane.

Accordingly, the curvature of the currently estimated position P5 is significantly different from that of the previously estimated position P5', and there is a large difference between the target vehicle speed at the position P5 and that at the position P5'.

In this manner, in step S501, it is determined whether the difference between the target vehicle speed at the currently estimated position P5 and that at the previously estimated position P5' is greater than or equal to a predetermined threshold (20 km/h, for example). Step S501 is executed for each of the estimated positions in the driving lane. It is also determined whether the difference between the target vehicle speed at the currently estimated position P10 and that at the previously estimated position P10' is greater than or equal to a predetermined threshold (20 km/h, for example).

If all the differences between the target vehicle speeds are smaller than the predetermined threshold, the controller sets a route switching flag to be OFF in step S502.

If any of the differences between the target vehicle speeds is greater than or equal to the predetermined threshold, the controller sets the route switching flag to be ON and maintains this state for a certain period in step S503.

As described above, in route switching determination processing, the controller determines whether the driving route has been switched.

(2-7. Curve Deceleration Control Execution Determination Processing)

Figure 3:
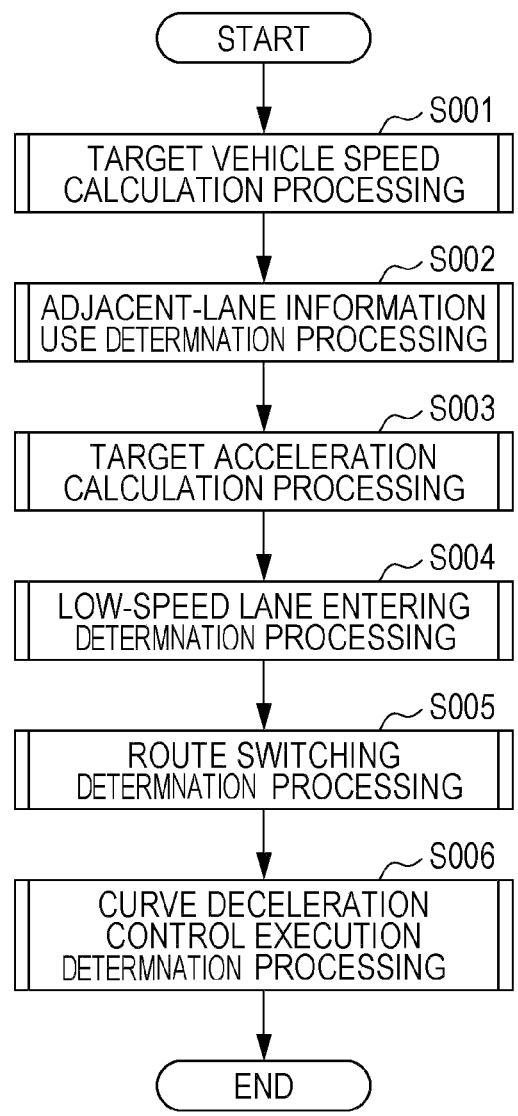
FIG. 3 is a flowchart illustrating the overall procedure executed by the driving support system.

In curve deceleration control execution determination processing in step S006, the controller determines whether to perform curve deceleration control based on the results of steps S001 through S005 in FIG. 3.

Figure 15:
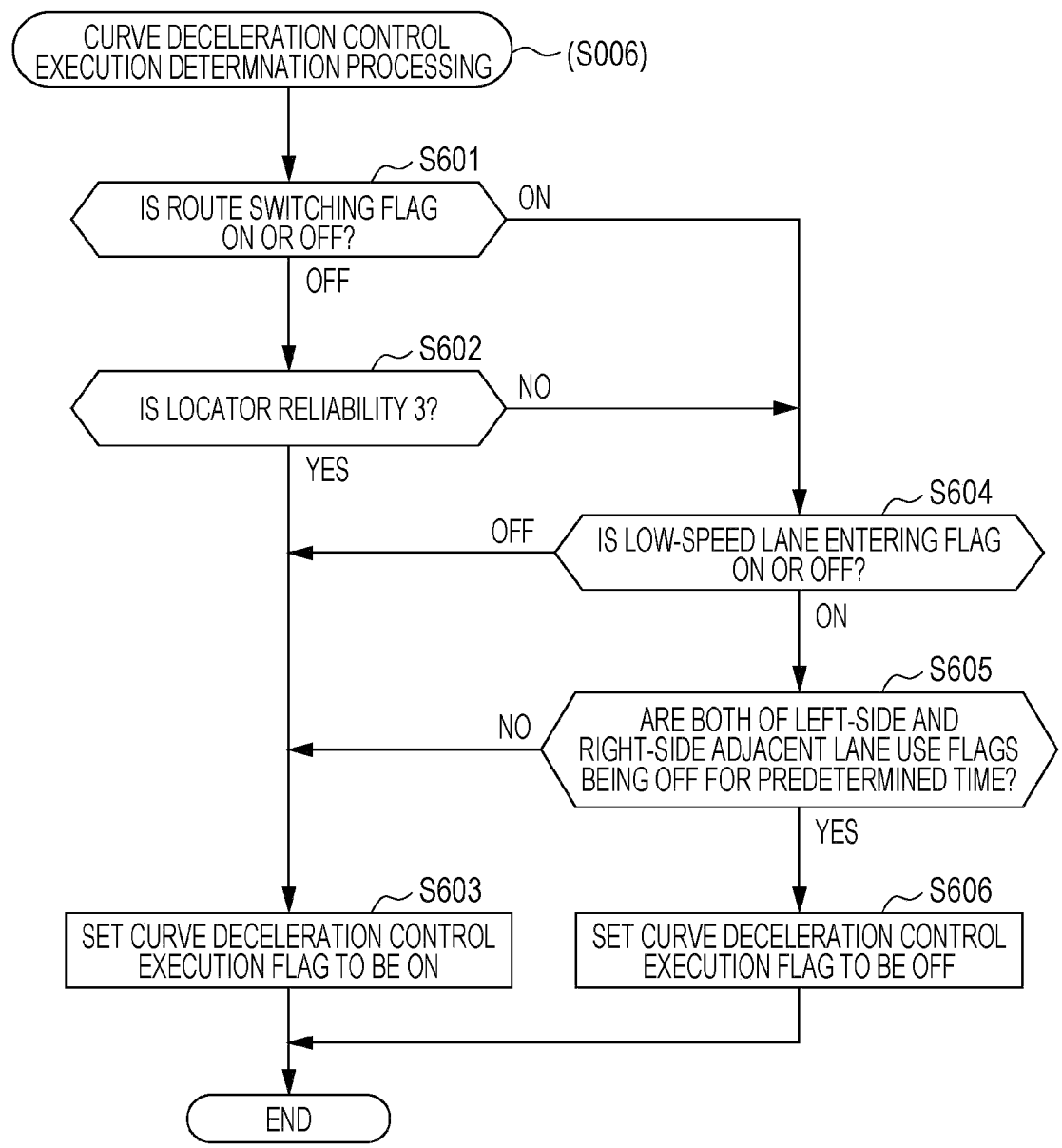
FIG. 15 is a flowchart illustrating an example of curve deceleration control execution determination processing.

An example of curve deceleration control execution determination processing will be explained below with reference to FIG. 15.

In step S601, the controller executes determination processing based on the route switching flag. If the route switching flag is found to be OFF in step S601, the controller determines in step S602 whether the locator reliability is 3.

If the locator reliability is 3, that is, if the route switching flag is OFF and if the locator reliability indicates the highest level, curve deceleration control can safely be executed. The controller thus sets a curve deceleration control execution flag to be ON in step S603.

That is, the controller performs curve deceleration control in accordance with the target vehicle speed at the estimated position P5 and that at the estimated position P10 in the driving lane.

If the route switching flag is found to be ON in step S601 or if the locator reliability is found to be 2 or lower in step S602, that is, if it is determined that the driving route has been switched or the driving lane of the vehicle 100 has not been identified, it may not be appropriate to determine at this timing that curve deceleration control can be performed.

The controller thus checks the low-speed lane entering flag in step S604.

If the low-speed lane entering flag is OFF, for example, if the controller recognizes that the target vehicle speed in the driving lane is higher than that in an adjacent lane, it may perform curve deceleration control based on curvature information about the driving lane, but there is no possibility that it perform unwanted curve deceleration control based on curvature information about the adjacent lane. The controller thus sets the curve deceleration control execution flag to be ON in step S603.

In contrast, if the low-speed lane entering flag is found to be ON in step S604, it means that the controller has determined that the vehicle 100 has entered a low-speed lane. However, if the vehicle 100 is actually driving in a high-speed lane, there is a possibility that the controller perform unwanted curve deceleration control.

To deal with this situation, the controller determines in step S605 whether a predetermined time (two seconds, for example) has elapsed after the adjacent-lane use flag is turned OFF. For example, the controller determines whether both of the left-side and right-side adjacent lane use flags are being OFF for the predetermined time.

If the predetermined time has not elapsed after the adjacent-lane use flag is turned OFF, such as if one of the left-side and right-side adjacent lane use flags is ON or has just been turned OFF, it means that the controller has recognized a driver's intention of changing lanes. The controller thus sets the curve deceleration control execution flag to be ON in step S603.

In contrast, if the predetermined time has elapsed after the adjacent-lane use flag is turned OFF, it means that the controller has not recognized a driver's intention of changing lanes. The controller thus sets the curve deceleration control execution flag to be OFF in step S606.

Individual cases which may occur in curve deceleration control execution determination processing in FIG. 15 will be discussed in detail.

Even if the route switching flag is ON and if the low-speed lane entering flag is ON (if the results of steps S601 and S604 are both ON), it is unknown that the driver has actually manipulated the vehicle 100 to switch the driving route. With the possibility that the controller has made a wrong determination, it might be inappropriate to perform curve deceleration control. In this case, the controller makes a determination about the adjacent-lane use flag in step S605.

If the adjacent-lane use flag (one of the left-side and right-side adjacent lane use flags) is ON, it means that the controller has at least recognized a driver's intention of changing lanes.

If the predetermined time has not elapsed after the adjacent-lane use flag is turned OFF, such as if the adjacent-lane use flag is ON, it can be assumed that the driver has manipulated the vehicle 100 to switch the driving route. The controller thus sets the curve deceleration control execution flag to be ON.

If the locator reliability is 2 or lower and if the low-speed lane entering flag is ON (if the result of step S602 is NO and the result of step S604 is ON), it means that the driving lane has not been identified, and it might be inappropriate to perform curve deceleration control so as to avoid unwanted curve deceleration control. In this case, the adjacent-lane use flag is checked in step S605.

As is seen in adjacent-lane information use determination processing in step S002, if the adjacent-lane use flag is ON, it means that the locator reliability is 3, which is the highest level, that is, the driving lane has been identified and that the controller has recognized a driver's intention of changing lanes.

That is, although the locator reliability is found to be 2 or lower in step S602, it has been found to be 3 in step S002 in FIG. 3 immediately before step S602 is executed. The time elapsed from the execution of step S002 until the execution of step S602 is merely a short time (several milliseconds to several hundreds of milliseconds).

Even though the locator reliability is found to be 2 or lower at the current time (when step S602 is executed), if a driver's intention of changing lanes has been recognized based on highly reliable information obtained immediately before step S602 (that is, if the result of step S605 is NO), the controller sets the curve deceleration control execution flag to be ON and performs curve deceleration control.

In the above-described examples, the estimated position P5 in five seconds and the estimated position P10 in ten seconds are specified, and then, curvature information at these positions are obtained. However, a different approach may be employed for obtaining curvature information. For example, curvature information about positions ahead of the current position of the vehicle 100 by certain distances (such as 100 m and 200 m) may be obtained. This approach makes it unnecessary to calculate an estimated position after a certain length of time based on the current speed of the vehicle 100.

In the above-described examples, the controller calculates target vehicle speeds based on curvature information and then determines whether to perform curve deceleration control based on a difference between the calculated target vehicle speeds. The disclosure may be applicable to a different situation. For example, if different speed limits are set for multiple lanes, it is desirable to execute deceleration control in accordance with the speed limit. It is assumed, for example, that a main lane is divided into two roads and the speed limit of one road is 50 km/h, while the other road is 100 km/h. In this case, it is desirable to suitably perform deceleration control regardless of whether the road is curved. The controller thus determinates whether the vehicle 100 is entering the road with a speed limit of 50 km/h or that of 100 km/h, based on information from the locator unit 10 and also based on how the turn signal switch 11c has been operated. Based on the determination result, the controller is able to perform deceleration control suitably while avoiding unwanted deceleration control.

When executing curve deceleration control as in the above-described embodiment, the controller may calculate the target vehicle speed for each lane, based on both of the speed limit and curvature information, and then determine whether to perform curve deceleration control.

The above-described driving support system 9 includes the information obtainer 23, the target vehicle speed calculator 24, the comparison processor 26, and the determination processor 27. The information obtainer 23 obtains curvature information about the curvature of a driving lane of the vehicle 100 and about the curvature of an adjacent lane (such as left-side and right-side adjacent lanes). The target vehicle speed calculator 24 calculates a target vehicle speed in the driving lane of the vehicle 100 and that in the adjacent lane by using the obtained curvature information. The comparison processor 26 compares the difference between the target vehicle speed in the driving lane and that in the adjacent lane with a threshold (predetermined thresholds Th5 and Th10). The determination processor 27 determines that a road branches off ahead of the vehicle 100 if the difference is greater than or equal to the threshold.

With this configuration, it is possible to perform deceleration control in accordance with whether a road branches off ahead of the vehicle 100. This can contribute to safety improvement.

In the driving support system 9, the information obtainer 23 may obtain the curvature information from a locator (locator unit 10).

Obtaining the curvature information from the locator unit 10 makes it possible to achieve high-accuracy determination processing. Obtaining information about the locator reliability together with the curvature information makes it possible to execute processing differently in accordance with the curvature information and the reliability level of position information about the vehicle 100. Hence, deceleration control can be performed more appropriately.

The driving support system 9 may further include the driving support controller 28. The driving support controller 28 performs curve deceleration control when the curvature of the driving lane of the vehicle 100 is greater than that of the adjacent lane (such as left-side and right-side adjacent lanes).

This makes it possible to suitably determine whether to decelerate more rapidly than in the adjacent lane, thereby achieving more appropriate curve deceleration control.

Even when the curvature of the driving lane of the vehicle 100 is greater than that of the adjacent lane (such as left-side and right-side adjacent lanes), the driving support controller 28 may not perform curve deceleration control if a driver's intention of changing lanes is not recognized.

It may be possible that the driving support system 9 wrongly determine that the vehicle 100 is running in a lane on which curve deceleration control is desirably performed although it is actually running in a lane on which curve deceleration control is unnecessary. Even in this situation, unwanted deceleration control can be avoided, thereby contributing to safety improvement.

In the driving support system 9, the driving support controller 28 may check for a driver's intention of changing lanes depending on whether a direction indicator (turn signal lamp) of the vehicle 100 is used. The driving support controller 28 may perform curve deceleration control based on the curvature of an adjacent lane (such as left-side and right-side adjacent lanes) in accordance with whether the direction indicator is used.

This enables the driver to concentrate on driving without performing a dedicated operation merely to demonstrate his/her intention of changing lanes, thereby enhancing the convenience and safety.

According to an embodiment of the disclosure, it is possible to correctly determine whether a road branches off in a traveling direction of a vehicle and to perform curve deceleration control appropriately.

The driving support system 9 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving support system 9 including the information obtainer 23, the target vehicle speed calculator 24, the target acceleration calculator 25, the comparison processor 26, the determination processor 27, and the driving support controller 28. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A driving support system for a vehicle, the driving support system comprising one or more processors, and one or more memories that store instructions for causing the one or more processors to execute the instructions including:
   obtaining curvature information about a curvature of a driving lane of the vehicle and about a curvature of an adjacent lane, the adjacent lane being adjacent to the driving lane;
   calculating a target vehicle speed in the driving lane and a target vehicle speed in the adjacent lane using the curvature information;
   comparing a difference between the target vehicle speed in the driving lane and the target vehicle speed in the adjacent lane with a threshold;
   determining, in a case where the difference is greater than or equal to the threshold, that a road branches off in a traveling direction of the vehicle; and
   performing deceleration control of the vehicle based on the determining that the road branches off in the traveling direction of the vehicle.

2. The driving support system according to claim 1, further comprising:
   a locator,
   wherein the curvature information is obtained from the locator.

3. The driving support system according to claim 1, wherein the one or more processors are configured to
   perform the deceleration control before the vehicle enters a curve based on determining that the curvature of the driving lane is greater than the curvature of the adjacent lane.

4. The driving support system according to claim 3, wherein, even if the curvature of the driving lane is greater than the curvature of the adjacent lane, the at least one processor does not perform the deceleration control when an intention of changing lanes by a driver who drives the vehicle is not recognized.

5. The driving support system according to claim 4, wherein the at least one processor performs the deceleration control on a basis of the curvature of the adjacent lane in accordance with whether a direction indicator of the vehicle is used.

6. The driving support system according to claim 3, wherein the at least one processor performs the deceleration control on a basis of the curvature of the adjacent lane in accordance with whether a direction indicator of the vehicle is used.

7. A driving support system for a vehicle, the driving support system comprising:
   circuitry configured to
      obtain curvature information about a curvature of a driving lane of the vehicle and about a curvature of an adjacent lane, the adjacent lane being adjacent to the driving lane;
      calculate a target vehicle speed in the driving lane and a target vehicle speed in the adjacent lane using the curvature information;
      compare a difference between the target vehicle speed in the driving lane and the target vehicle speed in the adjacent lane with a threshold; and
      in a case where the difference is greater than or equal to the threshold, determine that a road branches off in a traveling direction of the vehicle,
      perform deceleration control of the vehicle based on the determining that the road branches off in the traveling direction of the vehicle.

* * * * *